(12) United States Patent
Bowen (10) Patent No.: US 11,554,402 B2
(45) Date of Patent: Jan. 17, 2023

(54) SEAM SEALING ASSEMBLY

(71) Applicant: MESTEK MACHINERY, INC., Westfield, MA (US)

(72) Inventor: Marcus Bowen, Warrensville Heights, OH (US)

(73) Assignee: Mestek Machinery, Inc., Westfield, MA (US)

(*) Notice: Subject to any disclaimer, the term of this patent is extended or adjusted under 35 U.S.C. 154(b) by 286 days.

(21) Appl. No.: 16/410,317

(22) Filed: May 13, 2019

(65) Prior Publication Data

US 2019/0344320 A1   Nov. 14, 2019

Related U.S. Application Data

(60) Provisional application No. 62/775,594, filed on Dec. 5, 2018, provisional application No. 62/670,069, filed on May 11, 2018.

(51) Int. Cl.
*B21D 5/14* (2006.01)
*F16B 5/00* (2006.01)
*B21D 39/02* (2006.01)
*F16L 23/14* (2006.01)
*F24F 13/02* (2006.01)

(52) U.S. Cl.
CPC ............... *B21D 5/14* (2013.01); *B21D 39/02* (2013.01); *F16B 5/0096* (2013.01); *F16L 23/14* (2013.01); *F24F 13/0245* (2013.01)

(58) Field of Classification Search
CPC ........ B21D 39/023; B21D 5/08; B21D 5/083; B21D 5/12; B21B 31/20; B21B 27/10

USPC ... 72/248, 246, 176–182, 51, 210, 211, 214, 72/220; 29/521, 243.5, 243.58
See application file for complete search history.

(56) References Cited

U.S. PATENT DOCUMENTS

| | | | | |
|---|---|---|---|---|
| 2,569,544 A * | 10/1951 | Tal | ......... | B21D 7/022 72/219 |
| 2,925,114 A * | 2/1960 | Lewis | ......... | B23D 21/00 72/132 |
| 2,948,323 A * | 8/1960 | Kerr | ......... | B21D 7/06 72/210 |
| 3,590,618 A * | 7/1971 | Hyams | ......... | B21D 3/04 72/99 |
| 3,866,452 A * | 2/1975 | Neilsen | ......... | B21D 19/005 72/211 |
| 5,228,190 A * | 7/1993 | Sawa | ......... | B21D 39/021 29/243.57 |
| 5,706,692 A * | 1/1998 | Chubb | ......... | B21D 5/04 242/595.1 |
| 5,913,470 A * | 6/1999 | Scribner | ......... | B65H 20/02 226/90 |

(Continued)

OTHER PUBLICATIONS

Baileigh Industrial Inc., "Baileigh Industrial LF-20 Lockformer How To" https://www.youtube.com/watch?v=yNh63KDrwAo (10:00-11:00 and 13:00-14:00) (Year: 2018).*

*Primary Examiner* — Adam J Eiseman
*Assistant Examiner* — Bobby Yeonjin Kim
(74) *Attorney, Agent, or Firm* — Grogan, Tuccillo & Vanderleeden, LLP (57) ABSTRACT

A carrier for seam formation and sealing comprising a roller assembly having at least one roller; a housing for holding the roller assembly; a fastening member for mounting the roller to the housing; and the fastening member is an interchangeable mechanism.

9 Claims, 8 Drawing Sheets

(56) References Cited

U.S. PATENT DOCUMENTS

| | | | |
|---|---|---|---|
| 2010/0064748 A1* | 3/2010 | Ootsuka | B21B 37/32 72/8.1 |
| 2013/0104614 A1* | 5/2013 | Foster | F24F 13/0209 72/51 |
| 2014/0373335 A1* | 12/2014 | Daw | B21D 19/043 29/509 |
| 2020/0393161 A1* | 12/2020 | Foster | B21B 27/02 |

* cited by examiner

SEAM SEALING ASSEMBLY

CROSS REFERENCE TO RELATED APPLICATIONS

This application is a U.S. Nonprovisional Patent Application claiming the benefit of U.S. Provisional Application Ser. No. 62/670,069, filed on May 11, 2018, and U.S. Provisional Application Ser. No. 62/775,594, filed on Dec. 5, 2018, which is herein incorporated by reference in their entireties.

FIELD OF THE INVENTION

This invention relates, generally, to a seam sealing system and method, and in particular, to a seam sealing system and method for use with metal duct forming apparatuses.

BACKGROUND OF THE INVENTION

Apparatuses that are able to process a metal blank into one of any number of differing shapes and configurations, via the application of cutting and bending assemblies, are generally well known in the metal formation arts.

One application of known metal formation apparatuses is in the manufacture of metal ducts, most commonly rectangular metal ducts, from a metal blank. These known metal formation apparatuses typically use rollers and various cutting implements to create the base structure of the duct. Opposing lateral edges of the incomplete duct are shaped into matching seam halves that can be thereafter manipulated and integrated with one another to form a completed and sealed duct.

Metal ducts are commonly formed from different gauges of sheet metal in sections of predetermined length. The sections are then connected to form a continuous duct of desired length for typically used for distributing air or other gasses. Each section of duct is typically formed by bending two pieces of sheet metal of the desired length at a 90° angle. The edges of the piece are joined together forming what is commonly known as a seam. In a "Pittsburgh" type seam one edge of each sheet metal piece is formed with a longitudinally extending groove to form the female portion of the joint while the other edge is bent over along its length to form the male portion of the joint. The two parts are then assembled by inserting the male portion of each part into the female portion leaving an edge extending beyond the joint from the female portion. The extending edge can then be bent over to lock the seam.

It is therefore one object of the present invention to provide a seam sealing system and method for use in connection with formed metal structures, and specifically, to provide a seam sealing assembly that can more easily and efficiently seal a seam formed by a metal bending apparatus.

SUMMARY OF THE INVENTION

The seam sealing assembly includes a series of roller members which, acting in concert with one another, gradually bend the elements of the seam together to form a closed seam.

According to another object of the present invention, the seam sealing assembly includes a spring biased base to assist in the support and orientation of the metal duct whose seamed is to be closed.

According to yet another aspect of the present invention, the seam sealing assembly also includes one or more interchangeable roller members whose orientation can be selectively changed to thereby provide to the seam closing assembly greater operational utility.

BRIEF DESCRIPTION OF THE DRAWINGS

Features and advantages of embodiments of the present invention will become apparent on reading the detailed description below with reference to the drawings, which are illustrative but non-limiting, wherein.

DETAILED DESCRIPTION OF THE INVENTION

Reference will be made below in detail to exemplary embodiments of the invention, examples of which are illustrated in the accompanying drawings. Wherever possible, the same or similar reference characters used throughout the drawings refer to the same or similar parts, without duplicative description.

Multiple embodiments of a seam closing assembly, termed a "seam closing carrier," or "carrier," according to the present invention are variously shown in FIGS. 1-5.

Figure 1:
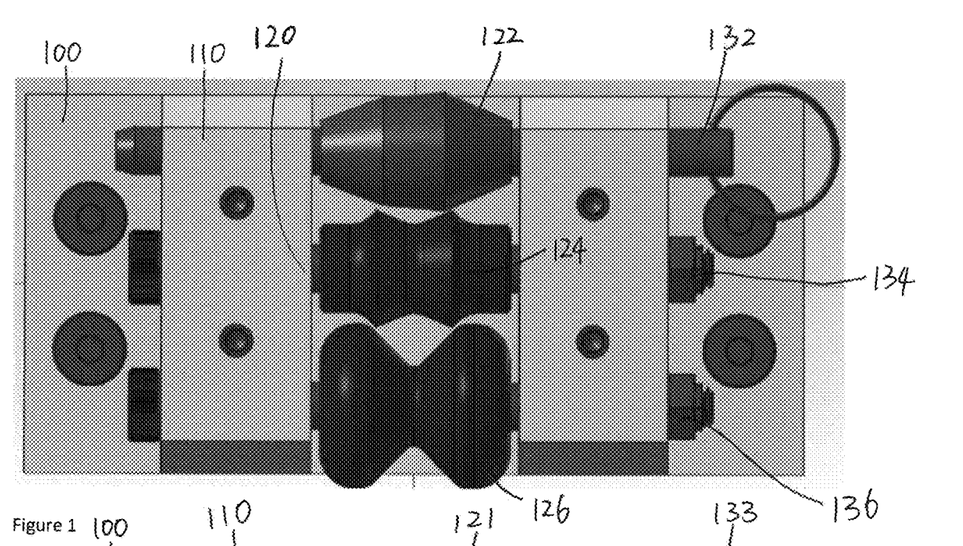
FIGS. 1 and 1A illustrates a top view of a carrier with a set of rollers and a fastening mechanism according to an embodiment of the invention.
Figure 1A:
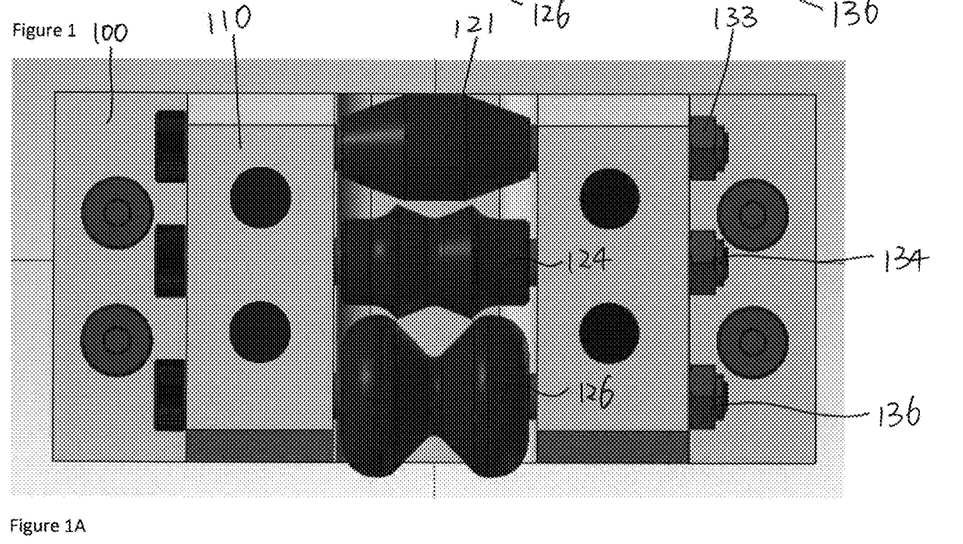

Shown in FIGS. 1 and 1A, a carrier 100 according to an embodiment of the invention includes a housing 110 having at least one seam forming member typically in the form of a roller assembly 120, which includes a first roller 122 on top, a second roller 124 in the middle, and a third roller 126 at the bottom (collectively "rollers"). The carrier 100 employs these three rollers, each sequentially acting on the metal piece to form a seam. As will be appreciated by those skilled in the art, the carrier 100 is capable of sealing any number of seam configurations, including a Pittsburgh seam, without departing from the broader aspects of the present invention. Indeed, a carrier may include one, two, three, or more rollers depending on the desired operations carried out on the metal blank. Additional rollers may take on one or more shapes and forms depending on the desired manipulation of the metal blank.

As shown in FIGS. 1 and 1A, the first roller 122 is attached to carrier housing 110 in a removable fashion by using an interchangeable mechanism 132 which includes a spring-biased pin passing through the center axis of roller 122. The roller 122 may be removed from spring-biased pin and changed with a substitute roller; or, the whole roller and pin assembly may be removed and replaced. Moreover, the roller 122 may be removed from the carrier 100, reoriented 180 degrees with its original left end being disposed on the right side, and its original right end being disposed on the left side, and then assembled onto the carrier 100 using the interchangeable mechanism 132.

The spring structure of the spring-biased pin may be integrated with the carrier housing 110 or may form a portion of the removable pin. Practitioners in the art may recognize that although a spring biased pin is shown, various other mechanisms, such as a cotter pin or spring clip may suffice. Importantly, the interchangeable mechanisms 132 can be removed from the carrier housing without using tools and/or specialized equipment, and therefore permits a machine operator to remove, replace and/or reoriented the roller without the use of such tools and/or specialized equipment.

The second roller 124 and the third roller 126, instead, are attached to carrier housing 110 by using permanent mechanisms 134 and 136. The permanent mechanisms attach the rollers to the carrier housing 110 in a way that the rollers either cannot be removed without damaging housing 110 or, in the alternative, a machine operator is required to use tools and/or specialized equipment to effect roller's removal, reorientation, and/or replacement.

In the embodiment demonstrated in FIG. 1, carrier 100 with a roller assembly 120 including three rollers (122, 124, and 126) has a first roller 122 known as a "barrel style" with a 5° angle, a second roller 124 having a 120-145° V-shape ("v-shaped" roller); and a third roller 126 having a about an 85-90° V-shape. The first roller 122 is selectively removable and reoriented by removing the spring biased-pin of the interchangeable mechanism 132 described above. As such, one having ordinary skill in the art would readily appreciate that, when the first roller 122 is reoriented, the 5° angle would face a direction that is opposite to the direction it faces before being re-oriented. In an alternative embodiment as shown in FIG. 1A, roller 121 is a a "barrel style" without any angle. It is mounted to the carrier housing 110 as the first roller by a permanent mechanism 131.

Figure 2:
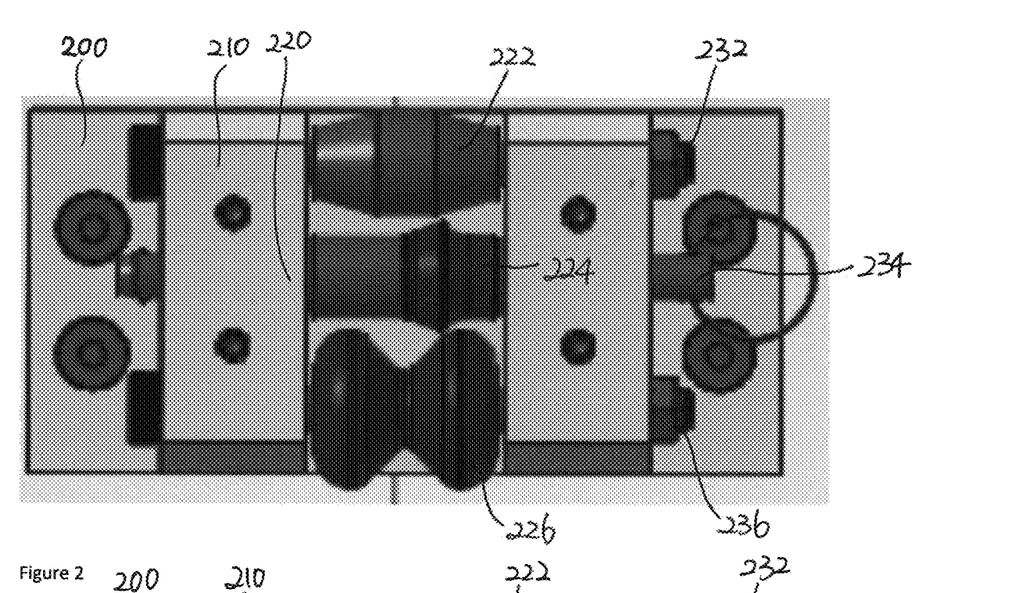
FIGS. 2 and 2A illustrate a top view of a carrier with a different set of rollers according to one embodiment of the invention.

In one embodiment, each roller of the roller assembly can be attached to the carrier housing either by a permanent mechanism, or a interchangeable mechanism which facilitates the roller to be removed and replaced in order to accommodate the orientation of the seam, the type of seam formed, the composition of the material to be seamed, or the roller state of wear. As illustrated in FIG. 2, the second roller 224 of the three roller assembly 220 is attached to the carrier housing 210 by an interchangeable mechanism 234, such that it is capable of being selectively removed and/or reoriented so as to enable a seam closing operation to occur on either lateral side of the seal closing assembly, thus providing an increased functionality to the seam closing assembly as a whole. In particular, the second roller 224 has a "half v-shape" which is substantially cylindrical on one half of the roller, and comprises a substantially conical shape on the other half of the roller, with the tapered end of the conical-shaped portion pointing to the center of the roller. This asymmetrical second roller 224 is configured to be selectively reoriented, such that the reorientation of the second roller 224 enabling a seam closing operation to occur on either lateral side of the seam closing assembly, thus providing an increased functionality to the seam closing assembly as a whole.

For example, in one embodiment for sealing a Pittsburgh seam, when the roller 224 is assembled onto the carrier housing 210 with its conical-shaped side being positioned on the left, it can seal the Pittsburgh seam whose male portion is positioned on the left. In contrast, when the roller 224 is reoriented and being assembled onto the carrier housing 210 with its conical-shaped side being positioned on the right, it can seal the Pittsburgh seam whose male portion is positioned on the right.

Figure 2A:
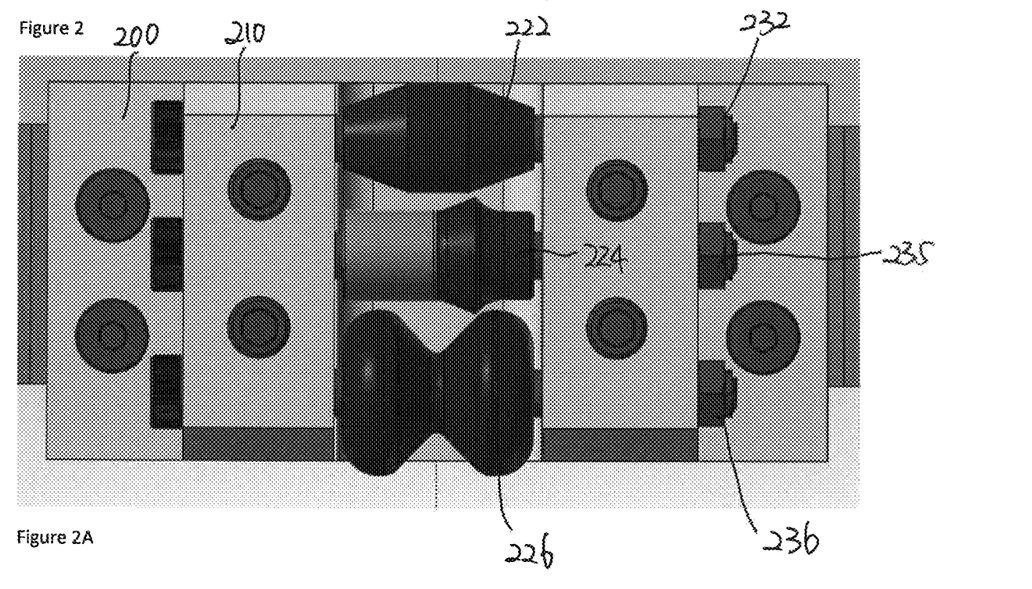

In an alternative embodiment as shown in FIG. 2A, the second roller 224 is mounted by a permanent mechanism 235.

Figure 3A:
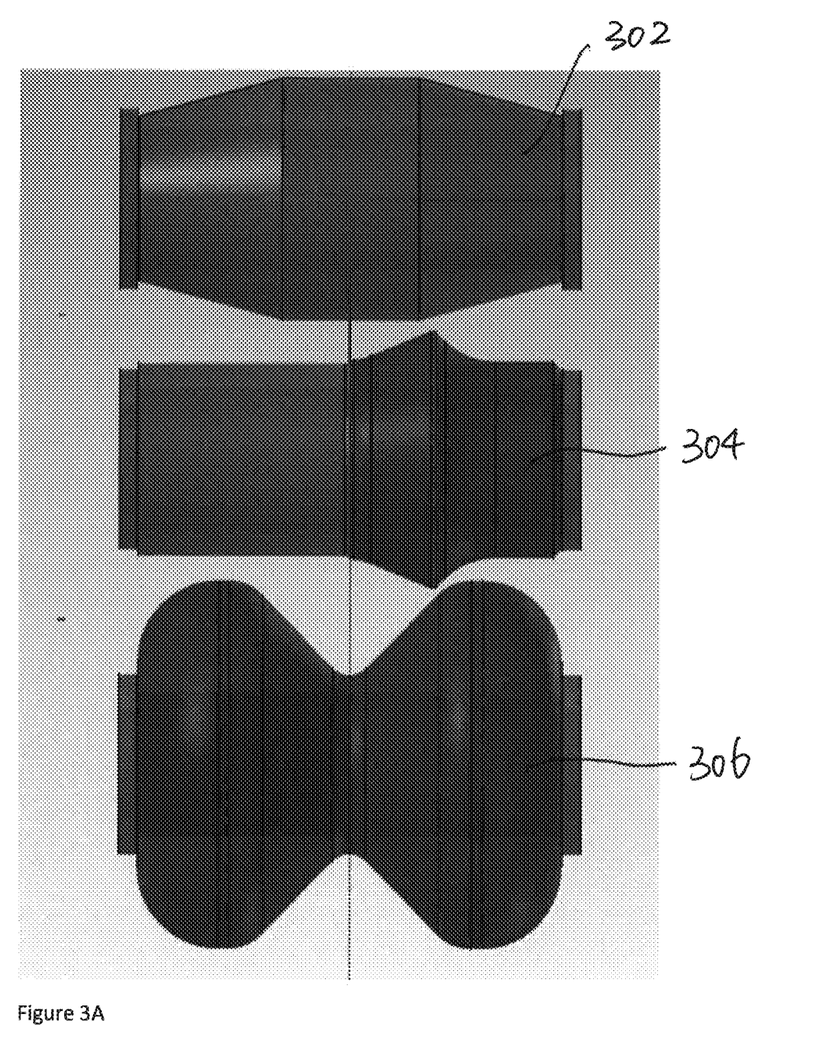
FIGS. 3A-3B illustrate rollers assembly in their various embodiments.
Figure 3B:
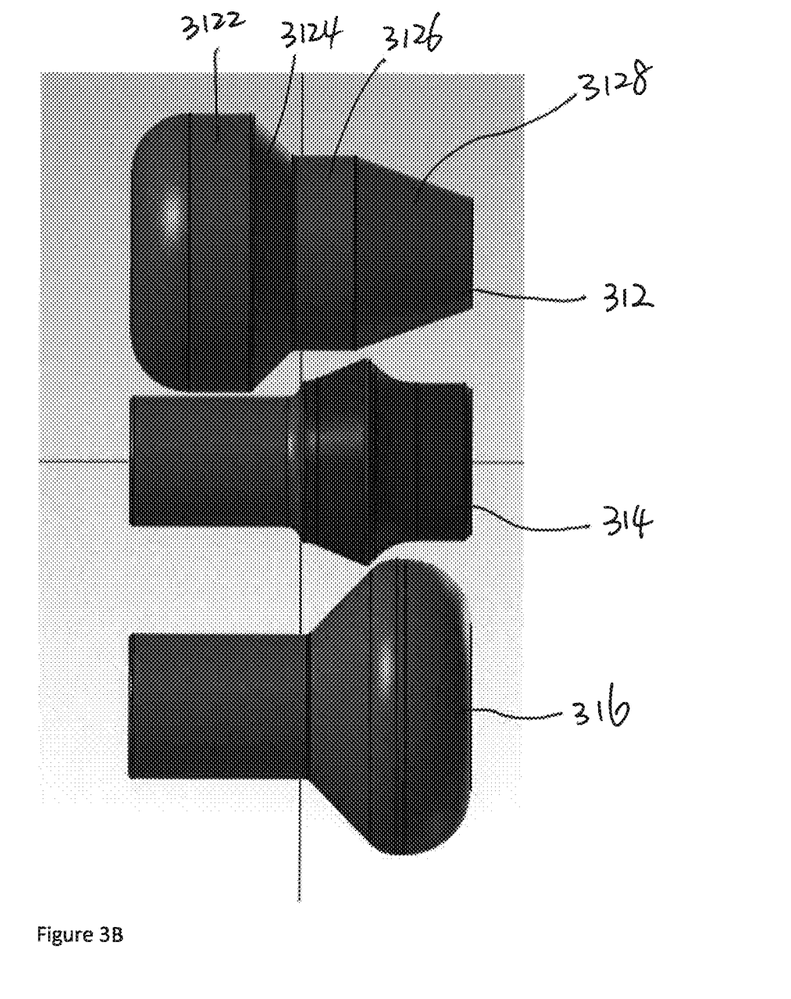

FIGS. 3A-3B show various embodiments of the roller assembly independent of the carrier. In particular, the roller assembly typically employs three rollers, each sequentially acting on the seam to be closed. The shape of each roller can be the same as or different from one another. For example, FIG. 3A shows one set of three rollers. The first roller 302 is a barrel-shaped roller with a substantially cylindrical shape in the middle, and tapered towards both ends of the roller. The second roller is a half v-shaped roller as described above. The third roller 306 is a V-shape roller with a tapered center.

FIG. 3B demonstrates another embodiment, comprising three asymmetrical rollers. The first roller 312 has a first conical-shaped portion 3124 on one side of the roller. The tapered end of the first conical-shaped portion points to the middle of the roller, while the opposite end of the first conical-shape portion abuts a first cylindrical shaped portion 3122. On the other half of the roller 312, a second cylindrical shaped portion 3126 abuts the tapered end of the conical shaped portion 3124. The second cylindrical shaped portion 3126 has a diameter which is smaller than the diameter of the first cylindrical shaped portion 3122. A second conical-shaped portion 3128 abuts the second cylindrical shaped portion 3126, and tapered towards the end of the roller 312.

The second roller 314 and the third roller 316 can both be half-v shaped. In particular, the second roller 314 and the third roller 316 both have a cylindrical-shaped portion on one side of the roller, and a conical-shaped portion on the other half of the roller, with the tapered end pointing to the middle of the roller. However, the conical-shaped portions' size, shape, angle and etc. can be different from each other.

As will be appreciated, the shape of each roller can be selected according to the operator's needs. The assembly is capable of sealing any number of seam configurations, including a Pittsburgh seam, without departing from the broader aspects of the present invention.

Figure 4A:
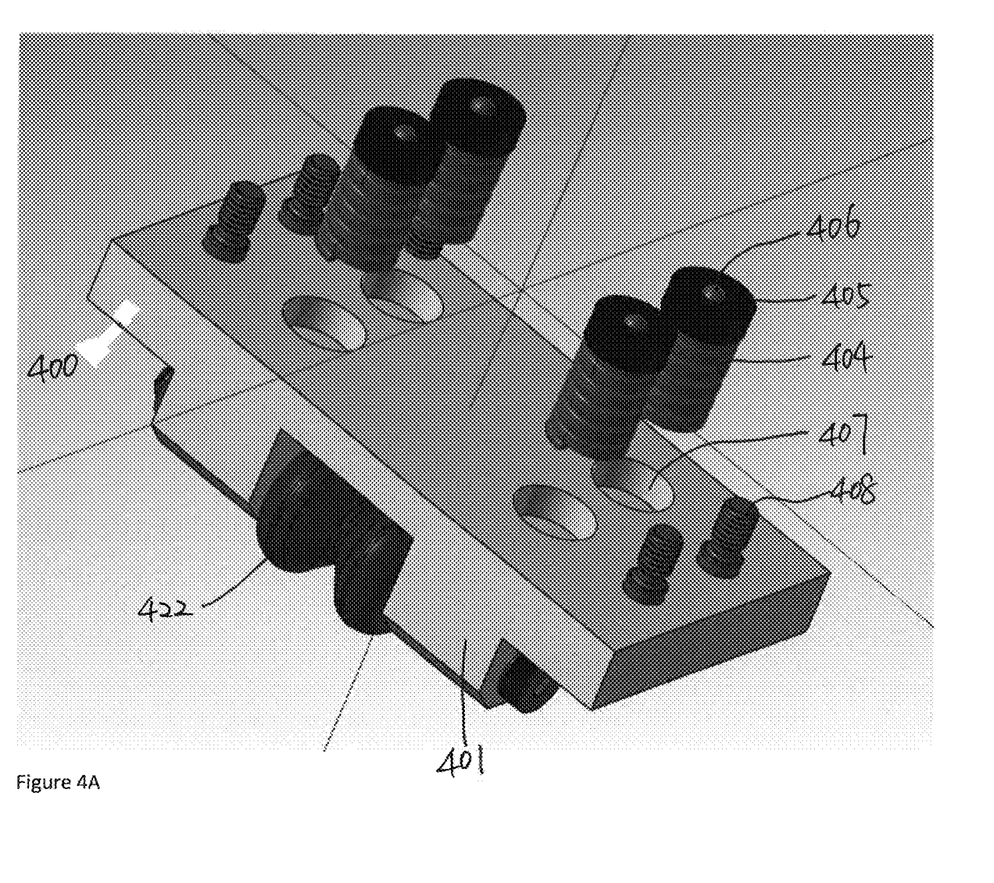
FIG. 4A-4C illustrates a carrier according to an embodiment of the invention.
Figure 4B:
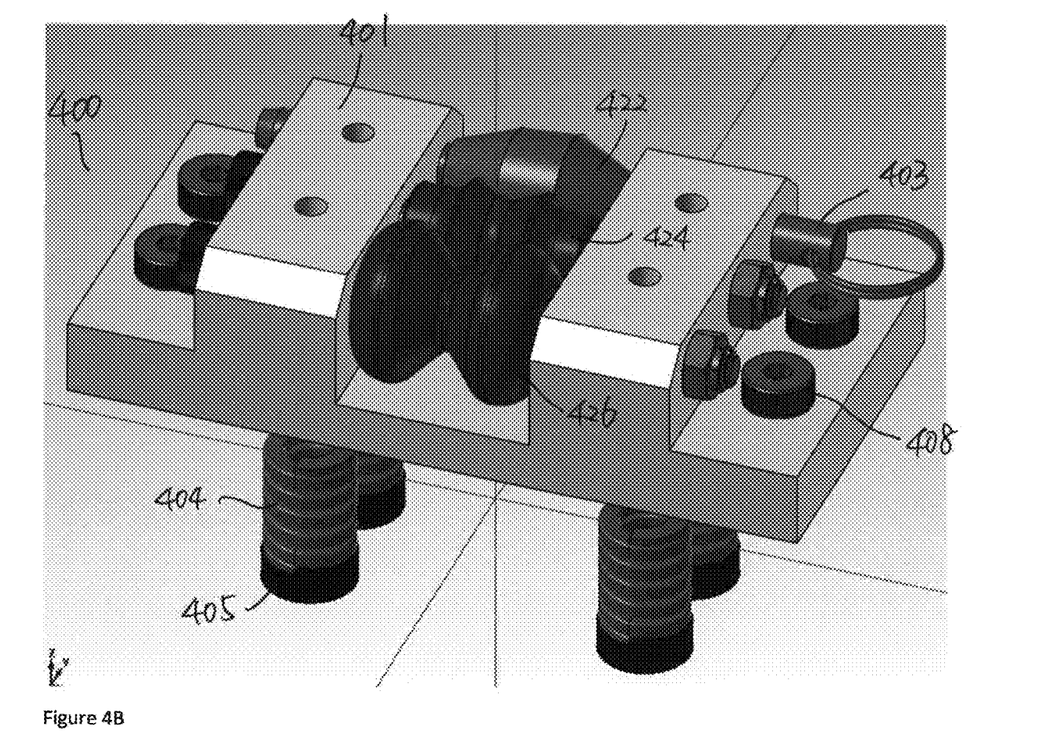
Figure 4C:
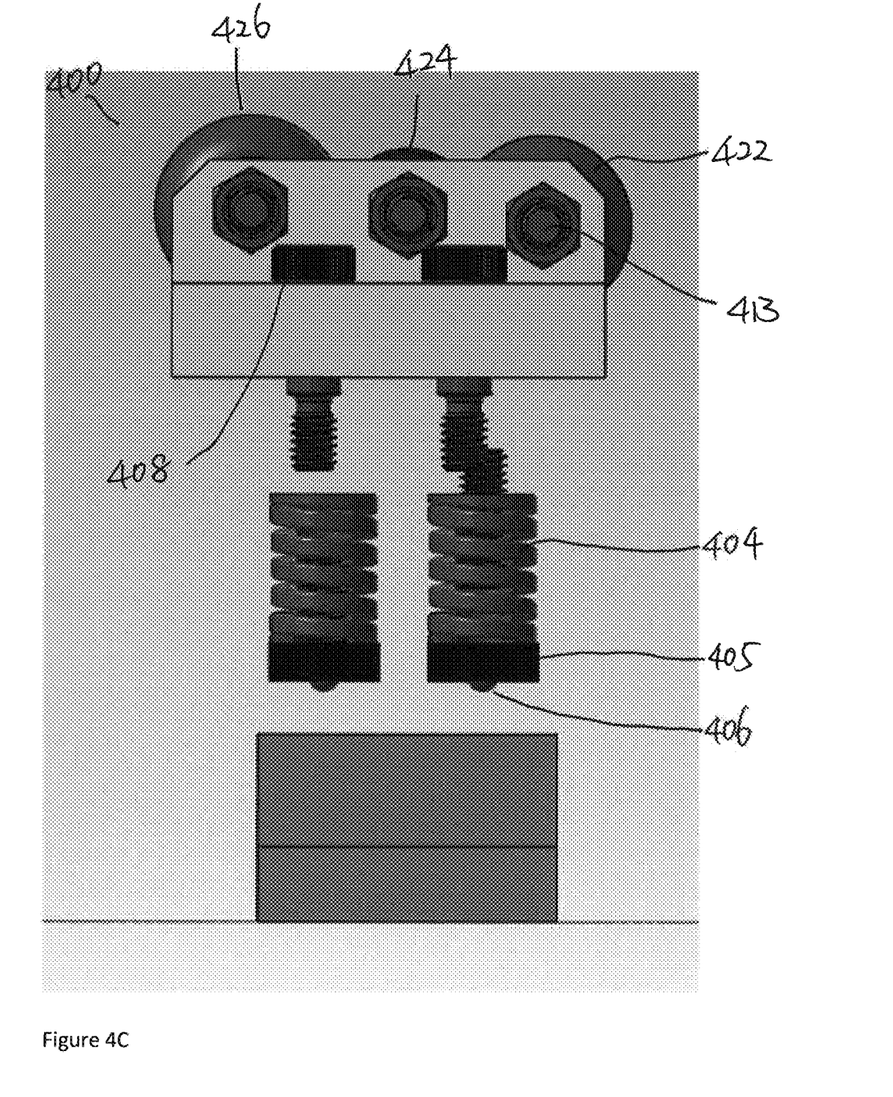

As shown in FIGS. 4A-4C, the three-roller assembly is integrated with a carrier support structure. The carrier support structure itself is attached to a carrier bar via a series of spring biased support legs.

Carrier support structures may be spring biased in a manner that allows the carrier to move with any discontinuities in the seam edge. This movement can be in the range of ⅛ to ¼ of an inch. FIG. 4A illustrates a means of supporting a carrier 400 via the seating of spring legs 404 capped with lined ends 405 and a half-sphere terminal ends 406 into the housing 401. Spring legs 404 are seated into holes 407 spaced across the plane of the carrier 400 opposite the plane that supports carrier housing 401 and rollers (422, shown is a roller analogous to 122c and 222). Half-sphere terminal ends 406 may be made of rubber or other vibration attenuating material. Set screws 408 are configured to mount carrier 400 to a carrier bar (not shown).

FIG. 4B illustrates an opposing view of FIG. 4A where spring legs 404 with lined ends 405 are aligned with holes 407 (not shown). The tops of set screws 408 are visible. Roller 422 is secured to carrier 400 via an interchangeable mechanism 403 having a spring-biased pin. Set screws 408 of various lengths control mounting of carrier 400 to a supporting surface and may adjust the carrier 400 length of travel as it moves over a seam edge by pre-tensioning the spring legs 404. FIG. 4C illustrates a side view of FIG. 4A, while replacing the interchangeable mechanism of FIG. 4B with a permanent mechanism 413.

Figure 5:
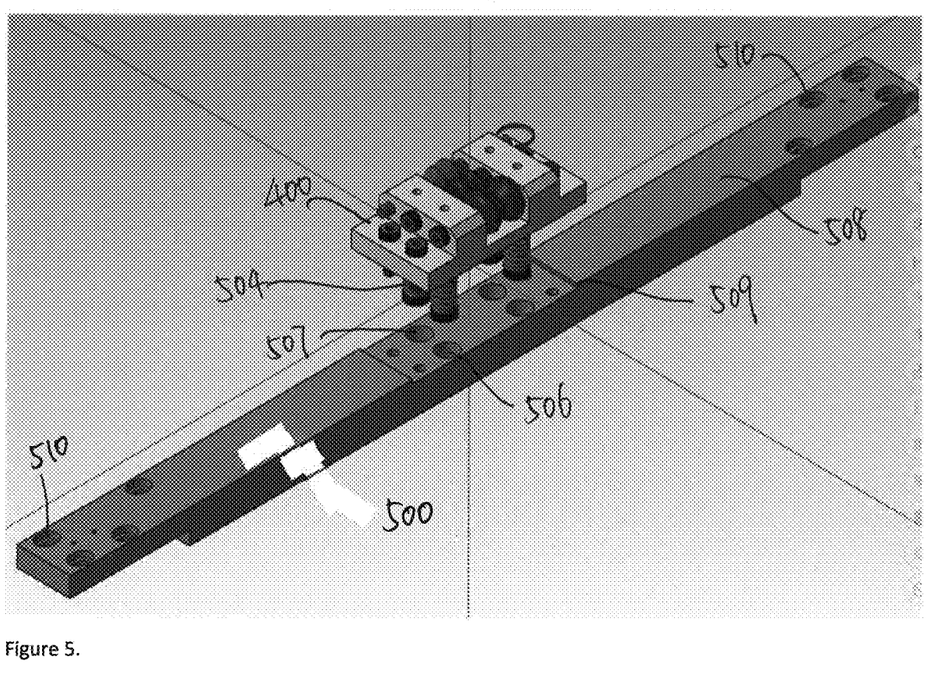
FIG. 5 illustrates a carrier in association with a carrier bar according to an embodiment of the invention.

FIG. 5 illustrates a carrier 500 with spring legs 504 being mounted to a carrier bar 500. The carrier bar 500 has a plurality of leg sockets 506 configured to receive spring legs 504. Practitioners in the art can appreciate that leg sockets 506 may vary in depth in order to accommodate different travel distances, or spring leg 504 tensions, for carrier 500 when it is engaged to a metal blank edge. Carrier receiving plane 507 is below primary plane 508 as differentiated by step 509. Step 509 is configured to retain carrier 500 and limit transverse movement of the carrier 500. Carrier bar mounting holes 510 are configured to enable carrier bar 500 as part of a larger seam-sealing apparatus to be mounted to guide members which ride on support members (not shown). In some practices, chain drives operably connected to motors move the carrier bar with the carrier along the guide members placing the rollers in contact with the length of the metal blank edge to form the seam.

As will also be appreciated, by connecting the carrier 500 to the carrier receiving plane 507 via the spring biased support legs 504, the present invention ensures that as the roller assembly travels along the length of the seam, via the carrier bar 500, any imperfections in the surface of the duct, or the position of the duct itself, can easily be accommodated by the increased flexibility offered by the spring biased support legs 504.

During seam formation operations, the rollers or other metal-manipulating elements of a seam formation machine can become coated or befouled. For example, by deposits left by the treated surface a galvanized metal blank, or material worn from the surface of a treated or untreated metal blank, or the like. Thus, it is yet another important aspect of the present invention that the rollers of the present three roller seam closing assembly are to be treated/coated with a release composition that assists in repelling the buildup of undesirable environmental contaminants on the surface of the rollers, during production and processing of a metal blank. Further, rollers may be altered in material composition in order to accommodate the application of a release compound. Thus, rollers, through the usage of a spring-biased pin mechanism or other release mechanism as described above, may be selectively removed and interchanged as release compound wears from the roller and/or fouling material builds up on the roller surface.

Finally, the written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A carrier for seam formation and sealing, said carrier comprising:
    a roller assembly having a first roller and a second roller, the roller assembly configured to deform said seam;
    a housing for holding said roller assembly;
    an interchangeable mechanism for mounting said first roller to said housing; and
    a permanent mechanism for mounting said second roller to said housing,
    wherein said interchangeable mechanism is operable to selectively alternate an orientation of said first roller between a first position and a second position, said first position being different from said second position.

2. The carrier for seam formation and sealing according to claim 1, wherein:
    said interchangeable mechanism comprising a spring biased structure.

3. The carrier for seam formation and sealing according to claim 1, wherein:
    said first roller is half v-shaped.

4. The carrier for seam formation and sealing according to claim 1, wherein said second roller defines a shape which is different from the shape of said first roller.

5. The carrier for seam formation and sealing according to claim 1, wherein:
    said roller assembly is coated with a release composition.

6. The carrier for seam formation and sealing according to claim 1, wherein said carrier further comprising:
    a supporting structure having at least one leg.

7. The carrier for seam formation and sealing according to claim 6, wherein:
    said at least one leg comprising a spring structure.

8. The carrier for seam formation and sealing according to claim 1, wherein:
    said roller assembly comprising three rollers.

9. The carrier for seam formation and sealing according to claim 1, wherein the permanent mechanism is configured to attach said second roller to said carrier housing such that the second roller cannot be removed without damaging housing or a machine operator is required to use a tool to remove said second roller.

* * * * *